United States Patent

Itai et al.

[11] 4,046,655
[45] Sept. 6, 1977

[54] PROCESS FOR ELECTROLYTICALLY PURIFYING A PHOTOGRAPHIC DEVELOPER WASTE SOLUTION

[75] Inventors: Reiichi Itai; Katsuyuki Murakami, both of Maebashi, Japan

[73] Assignee: The Japan Carlit Company, Ltd., Tokyo, Japan

[21] Appl. No.: 550,228

[22] Filed: Feb. 18, 1975

[30] Foreign Application Priority Data

Feb. 21, 1974 Japan .................. 49-19996

[51] Int. Cl.² .................. C02C 5/04; C02C 5/12
[52] U.S. Cl. .................. 204/149; 204/130
[58] Field of Search ........... 204/152, 149, 94, 111, 204/130, 151, 109, 131

[56] References Cited

U.S. PATENT DOCUMENTS

| | | | |
|---|---|---|---|
| 1,900,893 | 3/1933 | Hickman | 204/109 |
| 1,930,143 | 10/1933 | Hickman et al. | 204/94 |
| 1,937,179 | 11/1933 | Weisberg et al. | 204/109 |
| 2,737,298 | 3/1956 | Hendel | 204/149 X |
| 3,414,497 | 12/1968 | Kanai | 204/149 |
| 3,485,729 | 12/1969 | Hertz | 204/131 |
| 3,582,485 | 6/1971 | Guter et al. | 204/149 |
| 3,642,594 | 2/1972 | Crellin | 204/149 |
| 3,733,256 | 5/1973 | Anderson | 204/111 X |
| 3,778,307 | 12/1973 | Beer et al. | 204/149 X |
| B391,509 | 1/1975 | Fisch et al. | 204/109 |

OTHER PUBLICATIONS

Hillis, "Electrolytic Treatment of Effluents", Effluent and Water Treatment Journal, 2(12), (1969), pp. 647-650, 652-654.

Primary Examiner—Arthur C. Prescott

[57] ABSTRACT

A photographic developer waste solution is electrolytically purified by adding to said waste solution chloride ion and bromide ion; or chloride ion, bromide ion and iodide or iodate ion under limited pH, temperature, anode current density and current concentration conditions.

9 Claims, 2 Drawing Figures

PROCESS FOR ELECTROLYTICALLY PURIFYING A PHOTOGRAPHIC DEVELOPER WASTE SOLUTION

BACKGROUND OF THE INVENTION

1. Field of the Invention

The present invention relates to a process for electrolytically purifying a photographic developer waste solution, thereby easily and sufficiently degrading as well as removing from such a waste solution those components having high COD (chemical oxygen demand) concentrations.

2. Description of the Prior Art

Color photography is gaining wide acceptance among consumers and plates for photoprinting are being manufactured at a high rate, so large quantities of photographic developer waste solution must be discharged, and it is ecologically very objectionable to dump them into the waterways without due treatment thereof, for they contain in as much as tens of thousands of ppm those components which are high in COD levels and therefore prove to be pollutants to the water courses into which they are dumped. In addition, with the regulations on environmental pollutions being applied more rigorously in recent years, the removal of such pollutants from photographic developer waste solutions has become a matter of immediate attention.

The conventional techniques of purifying a photographic developer waste solution are twofold: one is thermal oxidative decomposition using hypochlorite as an oxidizing agent, and the other is an activated sludge process. The former, however, is disadvantageous in that it needs a long heating time, involves complicated procedures such as the control of the amount of agents to be used, and lastly, requires expensive agents, whereas in the latter, not only is large-scale equipment necessary including a pool for the waste solution but processing time is also inevitably increased. Neither method is successful in removing objectionable components of high COD values, because they leave behind components having COD concentrations of the order of 100 ppm and necessitate such secondary treatments as neutralization, precipitation, filtration or combustion, dilution and so forth. These additional steps cannot be taken without involving an increase in operating costs of the conventional processes. What is more, a recent method of adding salt (sodium chloride) to waste water including organic substances and effecting electrolysis to remove these components which have high COD values from the waste water is found to be impractical in sufficient removal of such objectionable components, for at the lower levels of COD, electrolysis becomes very difficult to carry out. Under such conditions, none of the predecessors of the present invention have succeeded in relying upon electrolytic oxidation alone for removing high concentrations of COD levels from the developer waste solution.

SUMMARY OF THE INVENTION

A primary object of this invention is to provide a process which is capable of removing high COD concentrations from a photographic developer waste solution economically with satisfactory results and which allows the treated waste solution to be dumped into water courses without further treatment.

Another object of this invention is to provide a process for rapidly, smoothly and sufficiently purifying the developer waste solution by effecting electrolytic oxidation under suitable conditions by using said waste solution as an electrolyte.

A further object of this invention is to provide a process requiring no intricate equipment, nor complicated processing techniques for electrolytically purifying a photographic developer waste solution.

Other objects and advantages of this invention will be clearly understood from the following description.

DESCRIPTION OF THE PREFERRED EMBODIMENT

The purification process of the present invention comprises adding to the developer waste solution either those precursors which impart chloride and bromide ions; or those which impart chloride, bromide, and iodide or iodate ions, and subjecting such waste solution to non-diaphragm electrolyte oxidation at a pH of 2 to 12, a temperature of 10° to 100° C, an anode current density of 2 to 40 amperes per square decimeter ($A/dm^2$) and a current concentration of 3 to 50 amperes per liter (A/l). According to this process, the COD concentrations of the waste solution are reduced almost to zero, and the waste solution can be dumped into the waterways without secondary treatment.

The photographic developer waste solution to be purified in the process of this invention is an aqueous colored alkaline solution, the COD concentrations of which are as large as tens of thousands of ppm; they contain metal, hydroquinone, phenidone, etc. as general developing agents, or derivatives of p-phenylene diamine as color developing agents; derivatives of phenol or naphthol, or compounds containing an active methylene group as couplers; sulfites as antioxidants; inorganic reducing substances or low molecular organic substances such as formaldehyde, hydroxyl amine salts, ethylene diamine tetraacetates as other additives. The purification process of this invention is applicable to a wide variety of developer waste solutions, such as a film-developer waste solution and a plate making-printing developer waste solution depending upon the proportions of their components.

Figure 1:
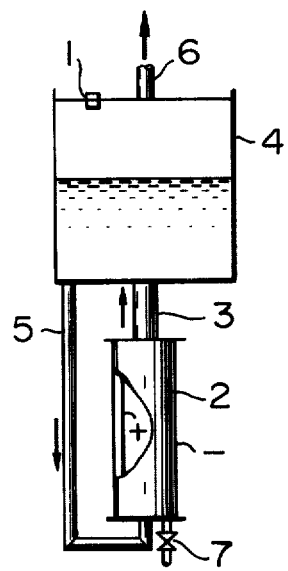
FIG. 1 is an outline of the electrolytic cell representing one mode of the electrolytically oxidative purification of the present invention.

We explain in the pages that follow one mode of our invention according to FIG. 1:

A mixture of 30 grams of sodium chloride, 20 grams of sodium bromide and 3 grams of sodium iodide dissolved in one liter of a color photographic developer waste solution (pH 10) having a COD concentration of 20,000 ppm of is fed into a tank 4 through an inlet 1 and current is conducted through a cylindrical electrolytic zone 2 composed of a platinum-plated titanium anode and an iron cathode. Electrolysis is performed at anode current densities of 10 $A/dm^2$ and current concentrations of 20 A/l. The gas generated in the electrolytic zone lifts the electrolyte through an upstream pipe 3 to the tank 4, which the electrolyte is then returned through a downstream pipe 5 to the zone repeating such circulation. The gas separates from the electrolyte within the tank 4 and is discharged from an exhaust outlet 6. Immediately after current is conducted, the electrolyte gradually turns black, and as the electrolysis proceeds to its middle phase, its viscosity increases forming some bubbles, but thereafter, the formation of bubbles comes to an end while the black color fades away gradually. During the course of electrolysis, the electrolyte is reduced from its initial pH 10 to a nearly constant level of 8 at the final stage of the electrolysis. In the meantime, the COD levels decrease almost to zero in a direct proportion to the time of operation. On the other hand, due to Joule's heat the temperature of the electrolyte is kept at 60°–65° C. On the eleventh hour from the commencement of electrolysis, the COD concentrations are reduced almost to zero. Nothing floats on or precipitates in a colorless transparent solution of the treated waste solution, which can be dumped into the water courses from an outlet 7. The cell operating voltage is maintained at about 4 V throughout the treatment. Although it is most often characterized by a gradual decrease of about 0.1–0.3 V by the end of electrolysis, no significant upsurge is observed in the later period.

The tank 4 to be used in the present invention may be cylindrical or prismatic, and may be composed of iron, heat-resistant plastics, porcelain and so on. It is equipped with an inlet and an outlet for the electrolyte and an outlet for exhaust gas, and may optionally include cooling or stirring means. However, a diaphragm is not necessary, for it makes the apparatus complicated and involves an increase of the cell voltage.

The preferred anodes include those conductive and durable metal substrates such as titanium, zirconium and tantalum which are plated with platinum group metals or their alloys like platinum, rhodium, platinum-iridium, platinum-palladium, platinum-rhodium, and platinum-ruthenium, or if one does not care about some metal dissolving in the electrolyte, magnetite may be used as plating layer of the substrates. Needless to say, the above materials can be used along, but lead dioxide or graphite should not be employed as the anode because they are rapidly consumed and produce low current efficiencies. As the cathode, iron, stainless steel and copper or the like can be used.

Before commencement of electrolysis, the pH of the photographic developer waste solution to be purified according to the present invention is adjusted to the range of 2–12. If the pH is below 2, not only does degradation slow down but other deleterious problems like corrosion of the cathode as well as of the cell or the generation of chlorine gas arise. On the other hand, if it is higher than 12, the increase in the viscosity of the electrolyte first retards the degradation of the waste solution, and secondly makes it very difficult to operate our process because the fluidity of the electrolyte is deteriorated and many bubbles are formed. When things turns worse, deposition of resinous layers on the surface of the anode increases electric resistance to such a level that current is no longer conducted through the electrolyte. Because untreated photographic developer waste solution has a pH in the vicinity of 10, current can be conducted through it without change in its initial pH, but it is still preferable to adjust the pH to the range of from 2 to 5.5, for by so doing, those influences of an increase in viscosity and formation of bubbles which inhibit the free movement of the electrolyte are weakened, and what is more, such adjustment helps the additives mentioned below to exhibit their desirable effects. If the electrolyte has an initial pH of 2–5.5, it maintains a constant value of 2–4 until the middle phase of the electrolysis, thereafter said pH begins to increase and converges to a level of 8 as the electrolysis nears its end. If the initial pH is in the range of 5.5 to 12, the pH is for some time maintained at 9–10, gradually decreases, and finally settles down at about pH 8 when the electrolysis ends. Accordingly, in either case, to adjust the initial pH of the waste solution to the range of from 2 to 12 is very advantageous, for not only is it unnecessary to control the pH in the course of electrolysis but the final value of 8 allows the treated waste solution to be dumped without additional neutralization steps. Among the agents which are used to adjust the pH of the waste solution to less than 5.5 are hydrochloric acid, sulfuric acid, acid sulfate and so forth. When a color photographic developer waste solution containing derivatives of p-phenylene diamine is subjected to electrolysis at a pH in the above-indicated range of pH 2 to 5.5, it may be desirable to add less than 8 grams of bromide ion per liter of a waste solution to the solution; otherwise, there may be a tendency to cause accumulation of deposits on the anode.

Even the adjustment of pH of the photographic developer waste solution does not satisfactorily solve the problems involved in applying non-diaphragm electrolytic oxidation to such solution; for one thing, it takes a long time to complete the electrolysis, and for another, electrolytic operation is difficult because bubbles which are formed during the procedure cause a loss of the electrolyte.

The conditions are avoiding such defects encountered in electrolytically oxidative process for purifying the photographic developer waste solution were thoroughly studied by us. We have at least discovered that the addition of suitable amounts of chloride and bromide ions helps to reduce the electrolysis time remarkably, and that if these ions are combined with iodide or iodate ions the formation of said bubbles is not only checked but also a deodorizing effect is unexpectedly brought about. These ions are originally contained in certain kinds of photographic developer waste solutions, but as a rule they are not present in so great an amount as to enable the electrolytically oxidative process of this invention to be operated on a commercial scale. Another approach to the electrolytic treatment of an organic waste solution is envisaged by adding salt to the waste solution, but this technique is not operable for its deficiency in the effect.

Figure 2:
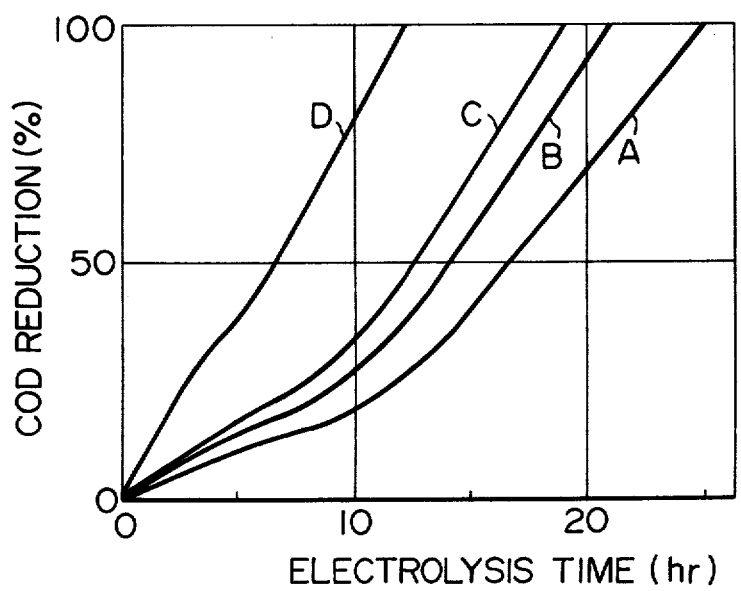
FIG. 2 is a COD reduction-electrolysis time curve which visualizes the effect on electrolysis of adding a chloride ion and/or bromide ion or further adding an iodide or iodate ion to the waste developer solution.

According to the purification process of the present invention, about 3–60 grams of chloride ions are first made to be present in the photographic developer waste solution. The ions help form hypochlorite, thereby accelerating the degradation of the wastes and increasing the conductivity of the electrolyte. Such acceleration of degradation and reduction in the cell voltage would not be realized if the chloride ions were present in an amount of less than 3 grams per liter of the waste solution. On the other hand, the presence of more than 60 grams of the ion per liter of a waste solution is not desirable because the above mentioned effects of the addition of the ion hit the peak at this level and the electrolyte, the pH of which inevitably increases to about 9, must be neutralized to offset the increase in the pH. The chloride ions are added in the form of sodium chloride, potassium chloride and so on. In the next step, about 3–25 grams of bromide ion per liter of a waste solution are made to be present. By this addition, degradation of the waste solution is accelerated and the deposition of electrolytic reaction products on the cell wall is prevented. When less than 3 grams per liter of a waste is present, the bromide ion is not effective as a purification accelerator, and more than 25 grams of the ion per liter of a waste solution gives rise to many problems, for example, increase in the pH of the electrolyte, formation of precipitates, corrosion of the cathode, and so forth. The bromide ions are added in the form of sodium bromide, potassium bromide, etc. As the third additive, about 0.08-9 grams of iodide or iodate ions per liter of a waste solution are made to be present in the waste solution. The presence of the iodide or iodate ions has an effect capable of repressing the formation of those bubbles which may cause a variety of accidents exemplified by the loss of the electrolyte and difficult exhaustion of the gas generated in the course of the treatment. It also eliminates the odor which is often detected in the course of electrolysis or in the purified waste solution. Such effects would never be exhibited by the presence of less than 0.08 grams of the ion per liter of a waste solution whereas if present in an amount of more than 9 grams of the ion per liter of a waste solution, the rate of degradation slows down and the costs of the additives increase. The compounds which contain such ions are sodium iodide, potassium iodide, sodium iodate, potassium iodate, etc., all of which can be employed in the present invention. The combination of these three ions is preferable to the case where no ions are added or only chloride or bromide ion is present in the waste solution because the frequency of troubles occurring in the course of electrolysis is low and the waste solution can be sufficiently purified in a period of almost half the time required for the above described cases. FIG. 2 illustrates the relation between the reduction of COD concentrations and the time course of electrolysis for each of the cases (A) where no ion-imparting precursors are added; (B) and (C) where 16 grams of sodium chloride per liter of a waste solution and an equal amount of sodium bromide are added, respectively; and (D) where 8 grams each of sodium chloride and sodium bromide and 1 gram of sodium iodide per liter of a waste solution are added. Other conditions for electrolysis for this Figure are in accordance with Example 1 which will be illustrated below. The same curve as (D) is described when 8 grams of sodium chloride and an equal amount of sodium bromide per liter of a waste solution are added but no sodium iodide is included.

The electrolytically oxidative process of a photographic developer waste solution according to the present invention is carried out at anode current densities in the range of from 2 to 40 $A/dm^2$. Below 2 $A/dm^2$, reaction proceeds at a slow rate and the cost of materials to be used is uneconomical. On the other hand, if the current density is greater than 40 $A/dm^2$, the life of the electrodes is remarkably reduced and power consumption increases because of high cell operating voltage. The preferred range of current densities is from 5 to 30 $A/dm^2$. The current concentration is selected at 3-50 A/l. A concentration below 3 A/l is not desirable because the reaction is slow and takes a long time, and bubbles are formed in the cell, the temperature of which does not rise so effectively, but on the other hand, if it is over 50 A/l the operation of the process as well as the designing of the cell becomes very difficult, for vigorous reaction causes many bubbles to be formed and large quantities of water are necessary to cool the electrolytic system. The temperature of the electrolyte is raised by Joule's heat and balanced by the current concentrations and room temperature. As a principle, cooling operation is unnecessary unless excessive current concentrations are selected. The higher the temperature, the more accelerated is the degradation, but electrolysis can be performed at a temperature within the range of from 10° to 100° C. If the temperature is lower than 10° C, many disadvantages appear such as slow reaction, vigorous formation of bubbles, consumption of the anode and increase in the cell voltage; the selection of a temperature higher than 100° C also causes not a few defects, for example, high consumption of the anode, corrosion and deterioration of the apparatus, necessity of neutralization due to the elevation of pH of the purified waste solution as well as the emission of unpleasant odors. The preferred range of temperature is from 30° to 70° C. Since this range is maintained throughout the electrolysis if the current concentrations are at 3-20 A/l, cooling is not required to control it.

The purification process of the present invention is based on non-diaphragm electrolytic oxidation, but the reaction mechanism of the process has not yet been elucidated because of the technological immaturity on organic electrolysis and the great number of objectionable components included in the waste solution to be treated.

The stirring of the electrolyte in the process of purification according to the present invention cannot be dispensed with, and not only mechanical stirring using some power but also the ascending movement of electrolysis-generated gas comprising hydrogen and oxygen are operable.

By applying the present invention's purification process to a photographic developer waste solution under the above prescribed conditions, the COD concentrations are reduced to almost zero nearly linearly thereby achieving the main purpose of the present invention; that is to say, the treated waste solution is a colorless transparent solution containing no precipitates or floating substances and it can be dumped in the water courses without applying secondary treatment. What is more, since the purification process of this invention produces nothing objectionable like chlorine gas during the course of electrolysis, it can be safely operated under natural exhaustion or ventilation alone. In this connection, either a batchwise or continuous operation will do in our process.

In accordance with the purification process of the present invention, high concentrations of COD levels involved in the photographic developer waste solution, which has been considered to be very difficult for the prior art techniques to purify sufficiently, are now reduced almost to zero rapidly, smoothly and at high efficiency, and the resulting purified solution can be discharged to the external environment without secondary treatment. The cost required for operating this process is extremely low: a quarter to a fifth of the cost incurred in the conventional "activated sludge" process or "thermal decomposition" method using hypochlorite as oxidizing agent, and half the cost necessary for effecting electrolysis with the addition of sodium chloride only. The time required for sufficiently removing the objectionable components from the waste solution in order to make it ecologically permissible is remarkably reduced to a half to a twentieth of that necessary in the conventional methods. Therefore, our process is very attractive from the standpoint of ease of operation and the great possibility of automatic control of our process in the future. Therefore, nobody will doubt that our purification process is sure to contribute in a great measure to the photographic field in solving environmental problems.

The following examples are given to further illustrate this invention, but it should be understood that the invention is by no way limited thereto. On the contrary, they are given only to clarify some of the essential working modes of the present invention.

EXAMPLE 1

A mixture of 50 grams of sodium chloride and 6 grams of sodium bromide per liter of a waste solution was added to and dissolved in a waste solution of color developer (Fuji CP-30). The pH of the resulting solution was adjusted to 4.7 with acid sodium sulfate (one crystal water). The thus adjusted solution was fed into a tank 4 of the electrolytic cell illustrated in FIG. 1 wherein the electrolytic zone 2 consisted of the cathode which was a cylindrical iron cell body 100 mm in diameter and the anode, platinum-plated titanium was lined on the cell body, and said zone was connected to the tank 4 with the downstream pipe 5 via the upstream pipe 3. The waste solution charged in this cell was subjected to elecytrolysis by conducting direct current at anode current densities of 10 A/dm$^2$ and current concentrations of 20 A/l. Soon after the initiation of electrolysis, the orange-colored electrolyte turned black, the pH decreased to about 3, and remained in this state for about 5 hours. Then, the color of the solution gradually faded away; it became brown, yellow, pale yellow, and finally turned almost colorless during the tenth hour from the initiation of the electrolysis. During this change of color, the pH of the electrolyte increased inch by inch, reached a value 7 during the seventh hour from the initiation of the electrolysis, and became constant thereafter, coming close to a pH of 8. The COD concentrations which were determined to be 22,000 ppm at the beginning of the electrolysis almost linearly decreased with the time course of electrolysis, and after 12.5 hours they were reduced almost to zero. The temperature of the cell remained at 20°-63° C throughout the operation and no cooling was required. The purified waste solution had a pH of 8.2; it was colorless and transparent and contained no substances floating or precipitating therein; it could be dumped in water courses from the electrolyte outlet 7 without additional treatment. At least until the middle phase of the electrolysis, the number of bubbles formed was by no means small and some odor was recognized, but little deposition was formed on the cell wall when electrolysis came to an end. During the electrolysis, the cell voltage was maintained almost constant at an average of 3.7 V, consuming 0.9 kWh of power per liter of the waste solution.

COMPARATIVE EXAMPLE 1

Table 1 shows the results of electrolysis performed under the same conditions as in Example 1 except for adding either 8 grams of sodium chloride or an equal amount of sodium bromide per liter of a waste solution to the same developer waste solution:

Table 1

| Add. per liter of a waste solution | Time for sufficient purification (hrs) | Bubbles | Deposition on Cell Wall | Precipitate | Odor |
|---|---|---|---|---|---|
| Nacl 8 grams | 22 | Yes | Yes | No | Yes |
| NaBr 8 grams | 21 | Yes | No | No | Yes |

Table 1-continued

EXAMPLE 2

Electrolysis was effected under the same conditions as in Example 1 adding not only sodium chloride and sodium bromide but also 0.3 gram of sodium iodide per liter of a waste solution to the same developer waste solution. Almost all COD concentrations were removed from the solution in 13 hours. Hardly any bubbles were formed in the middle phase of the electrolysis, and no odor was detected during the operation or in the purified waste solution.

EXAMPLE 3

A mixture of 75 grams of sodium chloride, 15 grams of sodium bromide and 1 gram of sodium iodide per liter of a waste solution was added to and dissolved in the waste solution of developer (Fuji-FD-9) with the pH of the solution being adjusted to 4.9, and subjected to non-diaphragm electrolytic oxidation using the same electrolytic cell as in Example 1 at anode current densities of 20 A/dm$^2$ and current concentrations of 30 A/l. As the operation proceeded, the pH of the solution decreased to about 3 and remained constant there after for about 10 hours. In the same period, the color of the solution changed from black to orange. Then, the pH rose by degrees and during the 14th hour from the initiation of the reaction became almost constant at 8, and at the same time, the solution turned nearly colorless. The COD concentrations which were determined to be 37,000 ppm when electrolysis commenced decreased in almost a direct proportion to the time course of electrolysis, and after 17.5 hours, they were reduced almost to zero. Neither bubbles nor odor was recognized in the course of electrolysis, and the purified waste solution was colorless and transparent and contained no impurities, so that it could be dumped in the waterways without secondary treatment. The cell temperature was in the range of 20° to 65° C and some cooling was required. The average cell operating voltage was 3.9 V consuming 2.05 kWh of power per liter of the waste solution.

EXAMPLE 4

A mixture of 15 grams of sodium chloride, 30 grams of sodium bromide and 8 grams of potassium iodide per liter of a waste solution was added to and dissolved in the waste solution (pH 9.8) of color developer (Fuji-CP-30) and subjected to electrolysis using the same electrolytic cell as in Example 1 at anode current densities of 10 A/dm$^2$ and current concentrations of 20 A/l. The initiation of electrolysis was followed up by an increase to 11 of the pH of the electrolyte, which slowly decreased afterward, and settled down at 8.5 when the treatment was finished. The color of the electrolyte first changed from reddish brown to black, and gradually faded away thereafter, became brown, yellow and finally turned almost colorless. The COD levels which were 21,800 ppm at the commencement of electrolysis became almost zero after 11.5 hours passed, and the purified waste solution needed no secondary treatment before being dumped in the waterways. The temperature of the cell was within the range of from 30° to 70° C and no cooling operation was required. The formation of bubbles during electrolysis and deposition on the cell was were both slight. The average cell voltage was 4.1 V consuming 0.95 kWh of power per liter of the waste solution.

EXAMPLE 5

A mixture of 30 grams of sodium chloride, 10 grams of potassium bromide and 2 grams of sodium iodide per liter of a waste solution was added to and dissolved in the waste solution of color developer (Fuji-CN-15), and the pH of the solution was adjusted to 5.4 with hydrochloric acid. The resulting solution was subjected to electrolysis in the same electrolytic cell as Example 1 except that titanium plated with platinum and iridium was employed as the anode. The other conditions were 30 A/dm² for anode current densities and 15 A/l for current concentrations. The COD levels which were 22,500 ppm at the beginning of the electrolysis were reduced almost to zero in 16 hours. The purified waste solution has a pH of 8.3 and needed no additional treatment before being dumped in the water courses. The cell temperature was within the range of from 25° to 67° C; the cell operating voltage was 3.6 V requiring 0.86 kWh of power per liter of the waste solution.

What we claim is:

1. A process for electrolytically purifying a photographic developer waste solution containing components having high COD values comprising adding to said waste solution three precursors to provide a concentration of from about 3 to about 60 grams of chloride ion, from about 3 to about 25 grams of bromide ion, and from about 0.08 to about 9 grams of iodide or iodate ion per liter of said waste solution, and subjecting the resulting waste solution to non-diaphragm electrolytic oxidation at a pH of 2 to 12, a temperature of 10° to 100° C., an anode current density of 2 to 40 amperes per square decimeter and a current concentration of 3 to 50 amperes per liter until said COD values are reduced.

2. A process of claim 1, wherein the pH is in the range of 2 to 5.5.

3. A process of claim 1, wherein the temperature, the anode current density and the current concentration are in the range of 30° to 70° C, 5 to 30 amperes per square decimeter and 3 to 20 amperes per liter, respectively.

4. The process of claim 1, wherein the chloride ion precursor is sodium chloride or potassium chloride.

5. The process of claim 1, wherein the bromide ion precursor is sodium bromide or potassium bromide.

6. The process of claim 1, wherein the iodide ion precursor is sodium iodide or potassium iodide.

7. The process of claim 1, wherein the iodate ion precursor is sodium iodate or potassium iodate.

8. The process of claim 1, wherein the electrolytic oxidation is conducted in an electrolytic cell the anode of which is selected from the group consisting of titanium, zirconium and tantalum plated with a platinum group metal or alloys of said platinum group metals.

9. In a process for electrolytically purifying a photographic developer waste solution containing components having high COD values, said components including metol, hydroquinone and phenidone as general developing agents, or a derivative of p-phenylene diamine as a color developing agent; a derivative of phenol or naphthol, or a compound contaning an active methylene group as a coupler; a sulfite antioxidant; an inorganic reducing substance, or formaldehyde, the improvement which comprises adding to said waste solution three precursors to provide a concentration of from about 3 to about 60 grams of chloride ion, from about 3 to about 25 grams of bromide ion, and from about 0.08 to about 9 grams of iodide or iodate ion perliter of said waste solution, and subjecting the resulting waste solution to non-diaphragm electrolytic oxidation at a pH of 2 to 12, a temperature of 10° to 100° C., an anode current density of 2 to 40 amperes per square decimeter and a current concentration of 3 to 50 amperes per liter, with the anode being selected from the group consisting of titanium, zirconium and tantalum plated with a platinum group metal or alloys of said platinum group metals, and applying the current to said waste solution until the impurities have been oxidized to a point where an acceptable COD concentration exists.

* * * * *